United States Patent
Tadanobu et al.

(10) Patent No.: US 6,992,880 B2
(45) Date of Patent: Jan. 31, 2006

(54) SOLID ELECTROLYTIC CAPACITOR AND ITS MANUFACTURING METHOD

(75) Inventors: Kazuo Tadanobu, Kyoto (JP); Yoshiro Maruhashi, Kyoto (JP); Takuhisa Sugimoto, Kyoto (JP); Yukihiro Take, Kyoto (JP); Yoshiaki Yamamoto, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 196 days.

(21) Appl. No.: 10/642,671

(22) Filed: Aug. 19, 2003

(65) Prior Publication Data

US 2004/0085712 A1   May 6, 2004

(30) Foreign Application Priority Data

Aug. 28, 2002  (JP)  ............................. 2002-248252

(51) Int. Cl.
*H01G 9/00* (2006.01)
(52) U.S. Cl. ..................... 361/523; 361/528; 361/530; 29/25.03
(58) Field of Classification Search ............... 361/502, 361/512, 523, 528, 508, 516, 503, 510, 525, 361/531, 534, 540, 541; 29/52.03, 25.03
See application file for complete search history.

(56) References Cited

U.S. PATENT DOCUMENTS

| | | | | |
|---|---|---|---|---|
| 3,766,442 A | * | 10/1973 | Pearce et al. | ............... 361/520 |
| 6,680,841 B2 | * | 1/2004 | Tadanobu et al. | ........... 361/523 |
| 6,768,632 B2 | * | 7/2004 | Hata et al. | .................. 361/523 |
| 6,816,358 B2 | * | 11/2004 | Kida et al. | .................. 361/540 |
| 2002/0141141 A1 | | 10/2002 | Nitoh et al. | |
| 2003/0039093 A1 | | 2/2003 | Tadanobu et al. | |

FOREIGN PATENT DOCUMENTS

| | | |
|---|---|---|
| JP | 4-243116 | 8/1992 |
| JP | 2000-138138 | 5/2000 |

* cited by examiner

*Primary Examiner*—Anthony Dinkins
(74) *Attorney, Agent, or Firm*—Wenderoth, Lind & Ponack, L.L.P.

(57) ABSTRACT

A solid electrolytic capacitor of the present invention has a structure where respective anode sections of capacitor elements are joined to an anode lead frame by resistance welding via a through hole formed in the anode lead frame. Current thus collects to the through hole during the welding to break a dielectric oxide film layer to expose aluminum foil, and the molten aluminum collects into the through hole. Stable welding work is therefore allowed without splashing the aluminum, and a solid electrolytic capacitor having high welding strength, high reliability, and reduced ESR can be obtained.

9 Claims, 9 Drawing Sheets

SOLID ELECTROLYTIC CAPACITOR AND ITS MANUFACTURING METHOD

BACKGROUND OF THE INVENTION

1. Field of the Invention

The present invention relates to a solid electrolytic capacitor used in a variety of electronic equipment and a manufacturing method thereof.

2. Background Art

Figure 12:
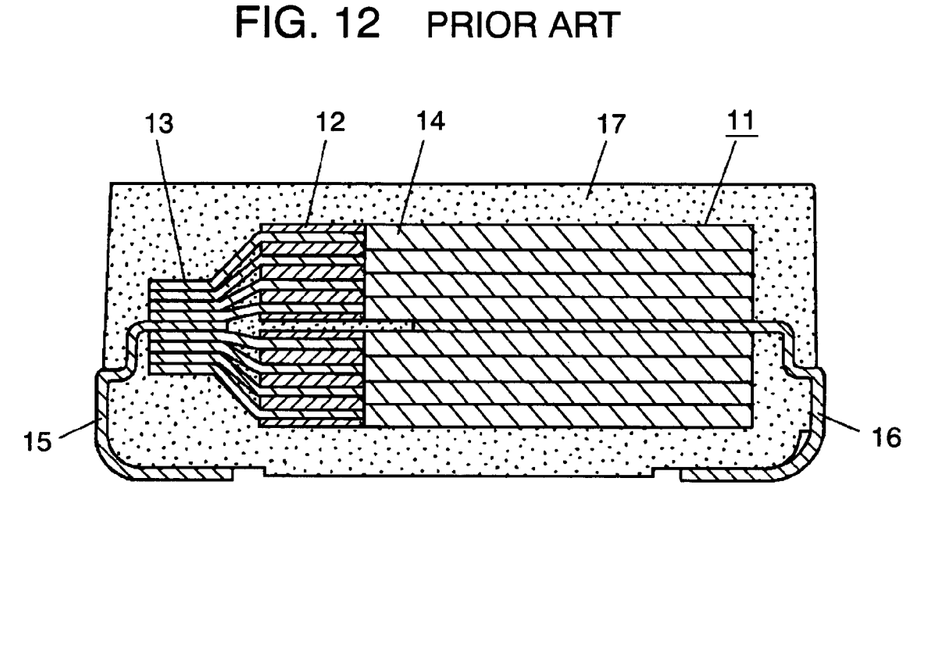
FIG. 12 is a sectional view of a structure of a conventional solid electrolytic capacitor.
Figure 13:
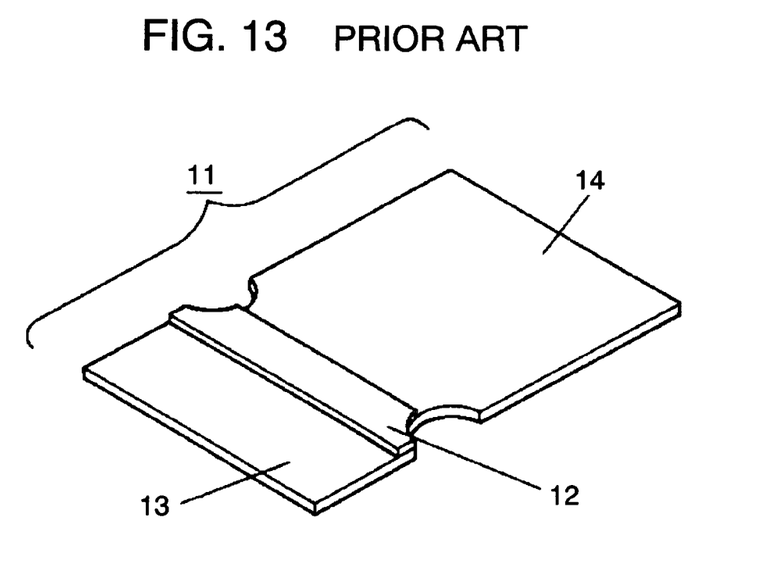
FIG. 13 is a perspective view of a capacitor element employed in the conventional solid electrolytic capacitor.
Figure 14:
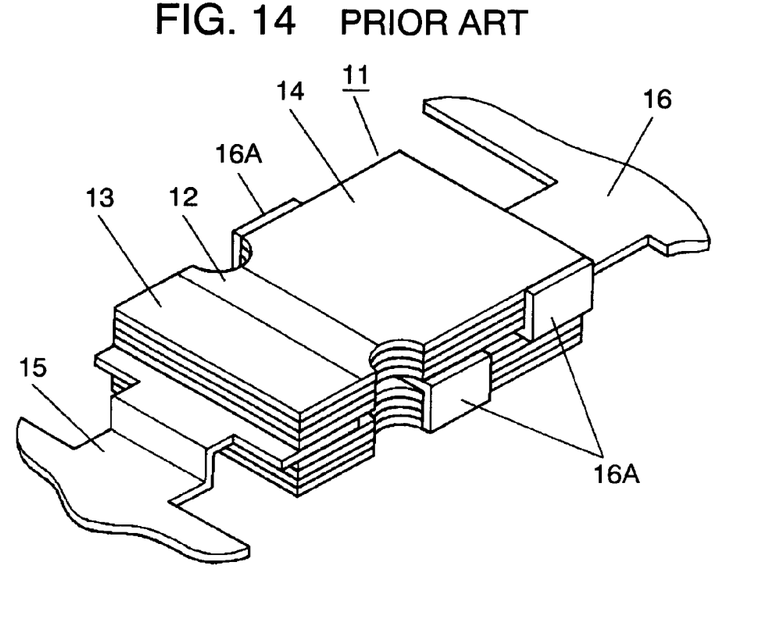
FIG. 14 is a perspective view of a state where the capacitor elements are laminated on anode and cathode lead frames in the conventional solid electrolytic capacitor.
Figure 15:
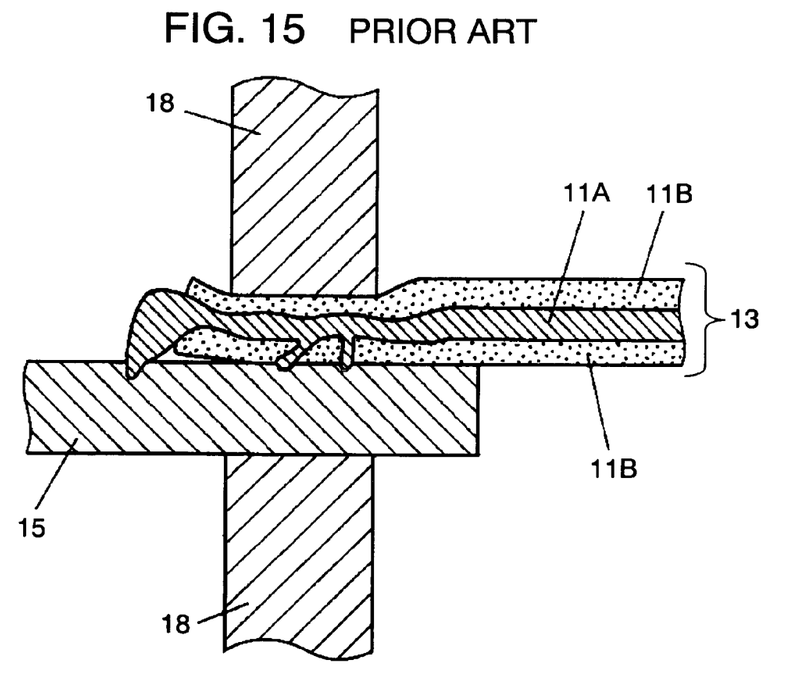
FIG. 15 is a sectional view of an essential part showing a state where an anode section is joined to the anode lead frame in the conventional solid electrolytic capacitor.

FIG. 12 is a sectional view of a structure of a conventional solid electrolytic capacitor. FIG. 13 is a perspective view of a capacitor element used in the solid electrolytic capacitor. FIG. 14 is a perspective view showing a state in which the capacitor elements are laminated on anode/cathode lead frames. FIG. 15 is a sectional view of an essential part of a state in which an anode section used in the conventional solid electrolytic capacitor is joined to the anode lead frame.

In capacitor element 11, as shown in FIG. 15, dielectric oxide film layer (it is hereinafter called film layer) 11B is formed on a surface of anode body 11A composed of aluminum foil, namely a valve action metal. Insulating resist part 12 separates anode section 13 from cathode section 14, and a solid electrolyte layer and a cathode layer (none of these are shown) are sequentially laminated on the surface of cathode section 14. Connecting parts 16A are formed by partially and vertically bending a flat part of cathode lead frame 16. Two sets of a plurality of capacitor elements 11 are laminated so that anode sections 13 are disposed on each of front and back surfaces of anode lead frame 15 and cathode sections 14 are disposed on each of front and back surfaces of cathode lead frame 16. Respective anode sections 13 of capacitor elements 11 are integrally joined to anode lead frame 15 by resistance welding. Respective cathode sections 14 are integrally joined to connecting parts 16A formed on cathode lead frame 16 via a conductive silver paste (not shown). The connecting parts 16A are positioned on the side surfaces of capacitor element 11 in the thickness direction. Insulating packaging resin 17 integrally covers the plurality of capacitor elements 11 so that anode lead frame 15 and cathode lead frame 16 are partially exposed from the outer surfaces of packaging resin 17. Anode lead frame 15 and cathode lead frame 16 extending out of packaging resin 17 are folded along packaging resin 17 to form respective external terminals. A surface-mount-type solid electrolytic capacitor is thus provided.

The conventional solid electrolytic capacitor has a problem in which welding can be extremely difficult when each of anode sections 13 of capacitor elements 11 is integrally joined to anode lead frame 15 by resistance welding. That is because film layer 11B is formed on the surface of anode section 13. This phenomenon is described with reference to FIG. 15. Film layer 11B is formed on the surface of anode body 11A in anode section 13 of capacitor element 11. Therefore, when anode section 13 is joined to anode lead frame 15 made of a material other than the aluminum forming capacitor element 11 by resistance welding using welding electrode 18, film layer 11B works as a high resistance to disturb flowing of the welding current. Only a part or no part of anode body 11A is therefore welded onto anode lead frame 15. Therefore, not only a defect due to insufficient welding strength but also increase and variation of equivalent series resistance (ESR) occurs.

For addressing the foregoing problems, a method such as increase of the welding currents or joining by laser welding is considered. However, in welding by this method, molten aluminum can extend to an exposed place of anode body 11 A such as a cut surface of anode section 13, or can be splashed. As a result, the new following problems occur: damage of the outward appearance, reduction in air tightness because of the a decrease of the thickness of packaging resin 17 by an amount corresponding to the extending aluminum, and occurrence of a short circuit.

SUMMARY OF THE INVENTION

A solid electrolytic capacitor of the present invention has an anode lead frame integrally coupled to respective anode sections of a plurality of laminated capacitor elements, and a cathode lead frame integrally coupled to respective cathode sections. A through hole is formed in a joint surface of the anode lead frame for supporting the anode sections of the capacitor elements. Respective anode sections of the capacitor elements are joined to the anode lead frame via the through hole by resistance welding.

DETAILED DESCRIPTION OF THE INVENTION

Exemplary embodiments of the present invention will be hereinafter described with reference to the accompanying drawings. Elements similar to each other in the exemplary embodiments are denoted with the same reference numbers, and the detailed descriptions of those elements are omitted.

(Exemplary Embodiment 1)

Figure 1:
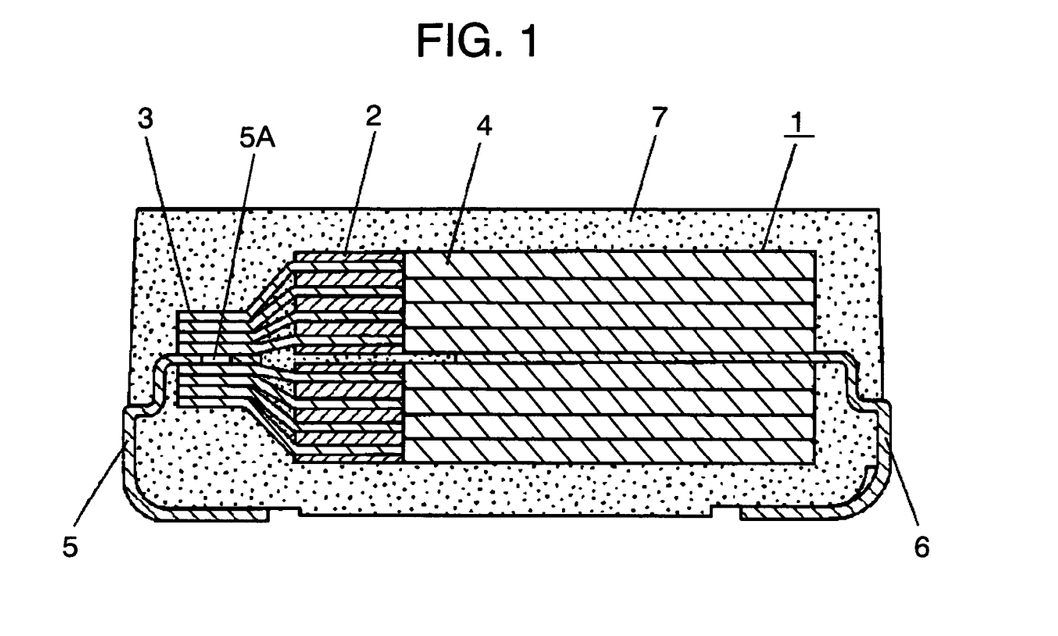
FIG. 1 is a sectional view of a structure of a solid electrolytic capacitor in accordance with exemplary embodiment 1 of the present invention.
Figure 2:
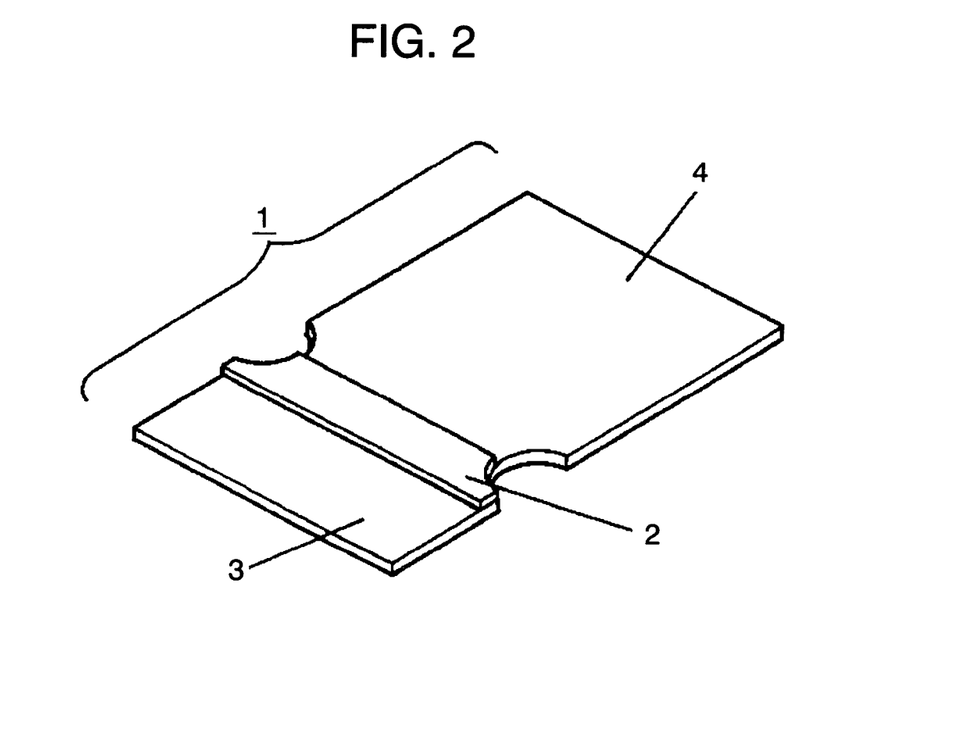
FIG. 2 is a perspective view of a capacitor element employed in the solid electrolytic capacitor in accordance with exemplary embodiment 1.
Figure 3:
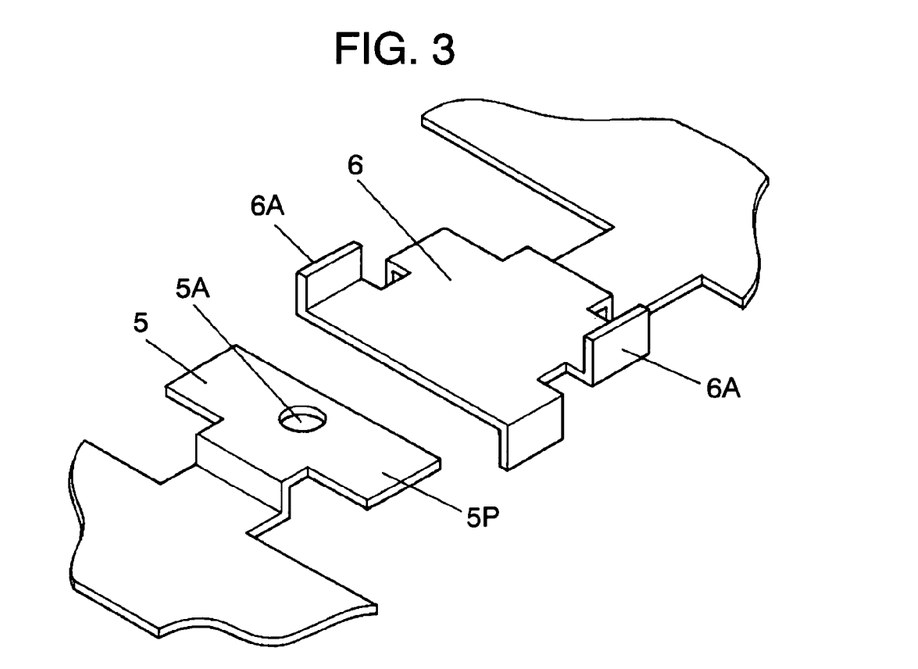
FIG. 3 is a perspective view of anode and cathode lead frames employed in the solid electrolytic capacitor in accordance with exemplary embodiment 1.
Figure 4:
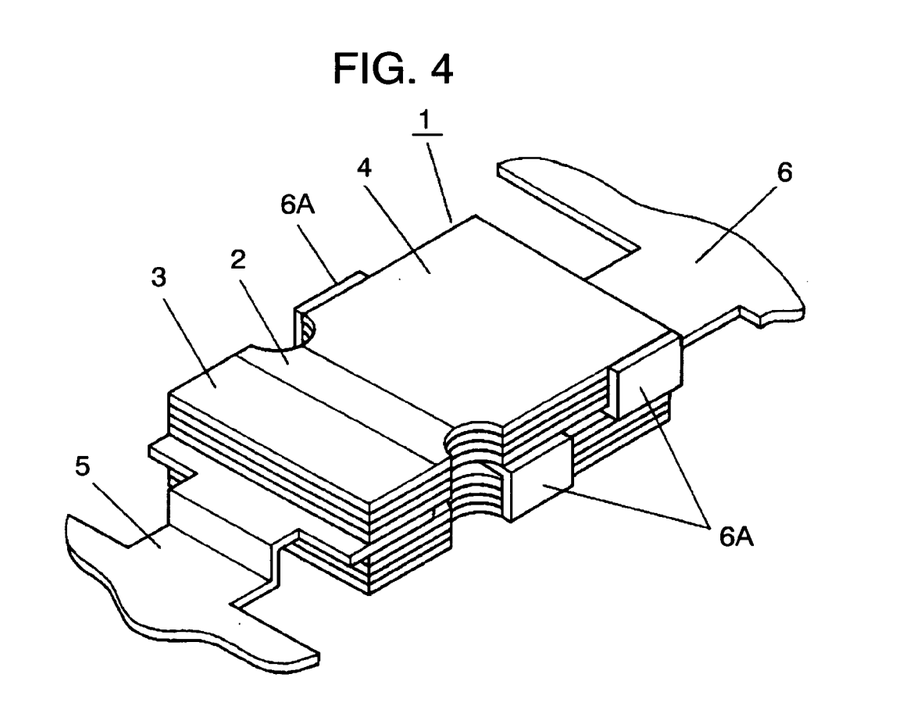
FIG. 4 is a perspective view of a state where capacitor elements are laminated on the anode and cathode lead frames in the solid electrolytic capacitor in accordance with exemplary embodiment 1.
Figure 5:
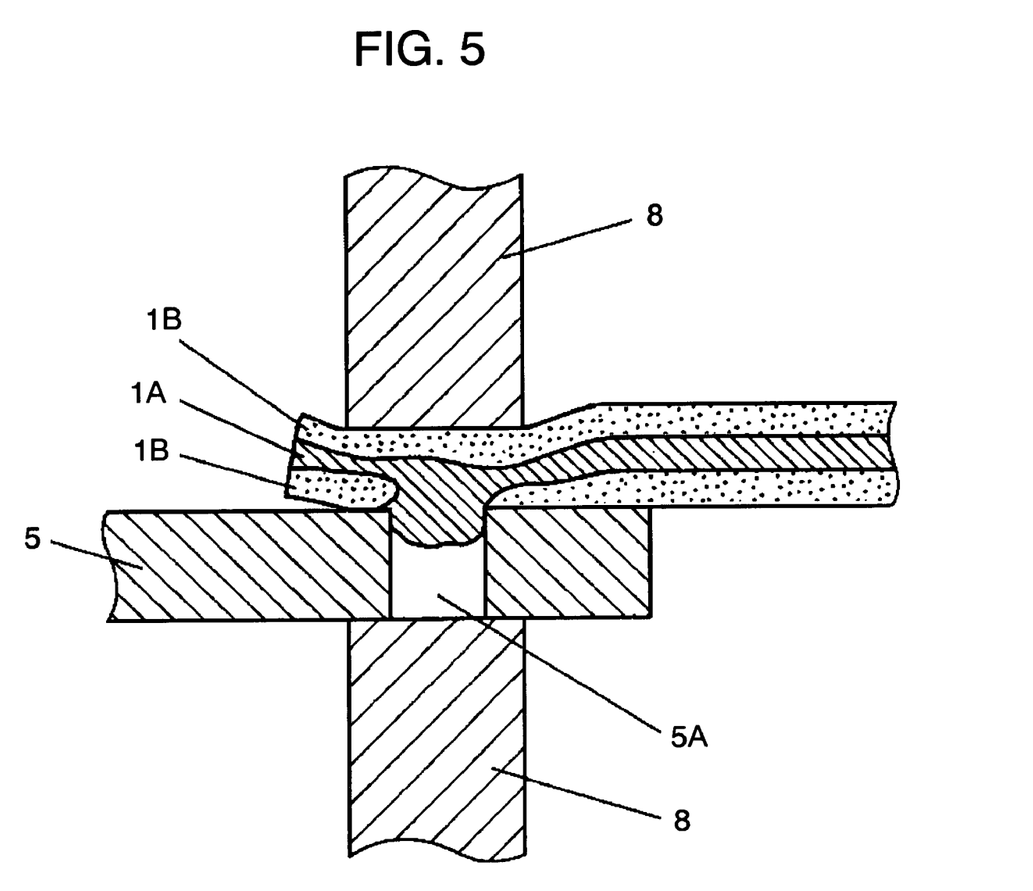
FIG. 5 is a sectional view of an essential part showing a state where an anode section of each capacitor element is joined to the anode lead frame in the solid electrolytic capacitor in accordance with exemplary embodiment 1.
Figure 6A:
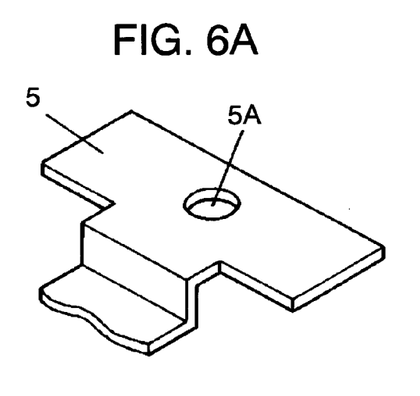
FIG. 6A to FIG. 6E are perspective views of essential parts showing various types of through holes formed in the anode lead frame in the solid electrolytic capacitor in accordance with exemplary embodiment 1.
Figure 6B:
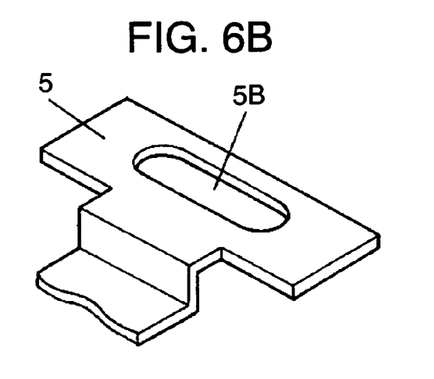
Figure 6C:
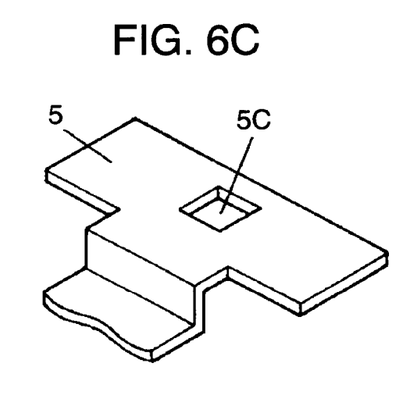
Figure 6D:
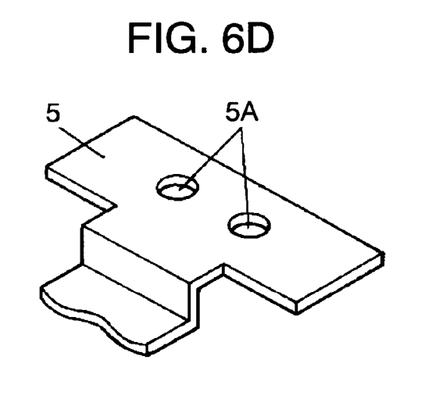
Figure 6E:
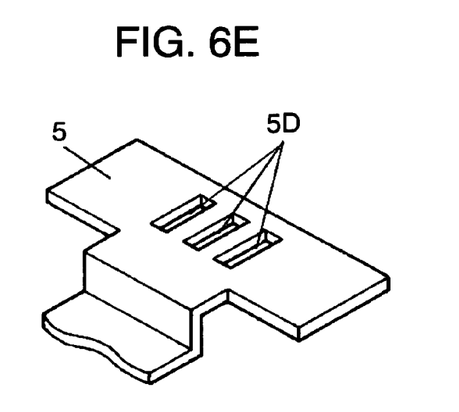

FIG. 1 is a sectional view of a structure of a solid electrolytic capacitor in accordance with exemplary embodiment 1 of the present invention. FIG. 2 is a perspective view of a capacitor element employed in the solid electrolytic capacitor. FIG. 3 is a perspective view of anode and cathode lead frames employed in the solid electrolytic capacitor. FIG. 4 is a perspective view of a state where the capacitor elements are laminated on the anode and cathode lead frames. FIG. 5 is a sectional view of an essential part showing a state where an anode section of each capacitor element is joined to the anode lead frame.

Each capacitor element 1 has dielectric oxide film layers (it is hereinafter called film layers) 1B on surfaces of anode body 1A composed of aluminum foil, namely a valve action metal. Insulating resist part 2 separates anode section 3 from cathode section 4, and a solid electrolyte layer and cathode layer (none of these are shown) are sequentially laminated on the surface of cathode section 4. Through hole 5A is formed in joint surface 5P of anode lead frame 5 for supporting anode section 3 of capacitor element 1. Both ends of a connecting surface of cathode lead frame 6 that supports cathode sections 4 of capacitor elements 1 are vertically bent to form connecting parts 6A. Two sets of a plurality of capacitor elements 1 are laminated so that anode sections 3 are disposed on each of front and back sides of joint surface 5P of anode lead frame 5 and cathode sections 4 are disposed on each of front and back sides of the connecting surface of cathode lead frame 6. Anode sections 3 are integrally joined via through hole 5A in anode lead frame 5 by resistance welding. Cathode sections 4 are integrally joined to connecting parts 6A formed on cathode lead frame 6 via a conductive silver paste (not shown). The connecting parts 6A are positioned on the side surfaces of capacitor elements 1 extending in the thickness direction.

Insulating packaging resin 7 integrally covers the plurality of capacitor elements 1 so that anode lead frame 5 and cathode lead frame 6 are partially exposed from the outer surfaces of packaging resin 7. Packaging resin 7 is made of epoxy resin. Anode lead frame 5 and cathode lead frame 6 extending out of packaging resin 7 are folded along packaging resin 7 to form respective external terminals. A surface-mount-type solid electrolytic capacitor is thus provided.

In the solid electrolytic capacitor of the present embodiment, anode sections 3 of capacitor elements 1 are joined to anode lead frame 5 via through hole 5A in anode lead frame 5 by resistance welding. Current collects to through hole 5A during the resistance welding by welding electrode 8. As shown in FIG. 5 in detail, the collection breaks film layer 1B formed on a surface of anode sections 3 to expose anode body 1A, and molten aluminum collects into through hole 5A. The resistance welding can be therefore performed extremely easily and certainly. As a result, welding workability, welding strength, and reliability are improved, and an ESR characteristic is stabilized. The molten aluminum is not splashed to the outside at all, differently from the prior art, so that any degradation of air tightness or short circuit due to the splashing does not occur at all and good joining work can be stably performed.

As examples of the solid electrolytic capacitor of the present embodiment having the foregoing structure, 30 of eight-layer laminated products having eight laminated capacitor elements 1 and 30 of conventional solid electrolytic capacitors are manufactured. Measured ESR characteristics of them are shown in Table 1. Withstand voltage and capacity of these capacitors are 6.3 V and 100 μF, respectively.

TABLE 1

| | ESR (mΩ) at 100 kHz, 20° C. | | | |
|---|---|---|---|---|
| | Average Value | Minimum Value | Maximum Value | Standard Deviation |
| Conventional Capacitors | 11.4 | 8.7 | 18.6 | 2.4 |
| Capacitors of Embodiment 1 | 9.7 | 8.1 | 11.4 | 0.8 |

As shown in Table 1, the capacitors of the present embodiment have less dispersed ESRs and a lower average ESR. This result indicates that the welding between anode section 3 and anode lead frame 5 is performed extremely sufficiently and stably.

FIG. 6A to FIG. 6E show various types of through holes formed in joint surface 5P of anode lead frame 5. Rather than circular through hole 5A, elliptic through hole 5B, square through hole 5C, rectangular through hole 5D, or a plurality of through holes 5A are formed, thereby expanding the area of welding. An optimal through hole configuration is selected appropriately from the examples shown in FIG. 6A to FIG. 6E and the like, depending on the shape or dimension of anode lead frame 5.

Total area of the through hole is preferably set at least 1.5 times the thickness of anode lead frame 5. This configuration further stabilizes the welding strength. When the thickness of anode lead frame 5 is 0.1 mm, for example, the total area of the through hole is set at 0.15 mm$^2$ or more. When the thickness of anode lead frame 5 is 0.2 mm, the total area of the through hole is set at 0.30 mm$^2$ or more.

(Exemplary Embodiment 2)

Figure 7:
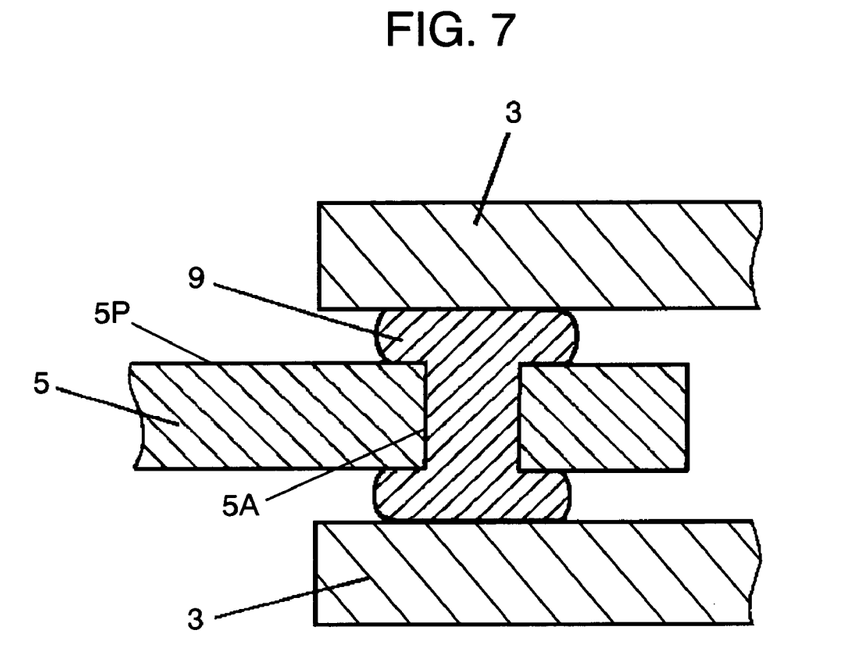
FIG. 7 is a sectional view of an essential part of a structure of a solid electrolytic capacitor in accordance with exemplary embodiment 2 of the present invention.

FIG. 7 is a sectional view of an essential part of a structure of a solid electrolytic capacitor in accordance with exemplary embodiment 2 of the present invention. Metallic rivet 9 is inserted into through hole 5A formed in joint surface 5P of anode lead frame 5 and is crimped there. Anode sections 3 of respective capacitor elements 1 are integrally coupled via rivet 9 by resistance welding. Rivet 9 is made of a metallic material different from a material forming anode lead frame 5. The structure of the present exemplary embodiment is the same as that of exemplary embodiment 1 except for the foregoing elements.

This structure is especially advantageous when metal joining between anode section 3 and anode lead frame 5 by resistance welding is difficult because the material of anode section 3 is different from that of anode lead frame 5. Even in this case, a metallic material easily joined to metals of them is selected as a material forming rivet 9, thereby improving welding performance to allow stable production of a highly reliable solid electrolytic capacitor.

Welding performance resulting from variation of materials of anode lead frame 5 and rivet 9 is shown in Table 2 compared with the case of no rivet 9.

TABLE 2

| Materials of Anode Lead Frame | Materials of Rivet | Number of Welding Failures |
|---|---|---|
| Iron | No | 0 |
|  | Copper | 5 |
|  | Aluminum | 0 |
| Copper | No | 10 |
|  | Iron | 0 |
|  | Aluminum | 2 |

In these capacitors, four capacitor elements are laminated, withstand voltage is 6.3 V, and capacity is 47 μF. The number of samples is 30.

Table 2 results in the following observation. Even when a combination of a material of anode section 3 and a material of anode lead frame 5 provides unstable welding performance in the case of no rivet 9, the welding performance is improved by selecting an appropriate material for rivet 9. Even when a combination of a material for anode section 3 of capacitor element 1 and a material for anode lead frame 5 makes alloy formation difficult, a rivet made of a material facilitating the alloy formation can be selected and anode section 3 and anode lead frame 5 can be resistance-welded together. When an inappropriate material is selected, the welding performance decreases. Attention must be directed toward selection and combination of materials.

(Exemplary Embodiment 3)

Figure 8:
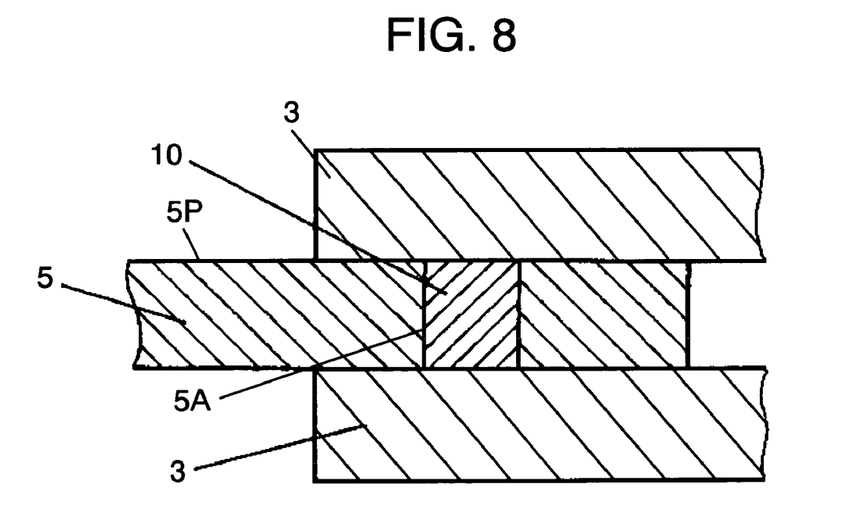
FIG. 8 is a sectional view of an essential part of a structure of a solid electrolytic capacitor in accordance with exemplary embodiment 3 of the present invention.

FIG. 8 is a sectional view of an essential part of a structure of a solid electrolytic capacitor in accordance with exemplary embodiment 3 of the present invention. Spacer 10 is made of a metallic material different from a material forming anode lead frame 5 and is buried in through hole 5A formed in joint surface 5P of anode lead frame 5. Respective anode sections 3 of capacitor elements 1 are coupled via spacer 10 by resistance welding. The structure of the present exemplary embodiment is the same as that of exemplary embodiment 1 except for the foregoing elements.

The solid electrolytic capacitor of the present exemplary embodiment having the foregoing structure produces an effect similar to that of the solid electrolytic capacitor of embodiment 2. Additionally, thickness of anode lead frame 5 is uniform, so that the laminating state of anode sections 3 is stabilized and assembling accuracy and reliability are improved when a plurality of capacitor elements 1 are laminated.

(Exemplary Embodiment 4)

Figure 9:
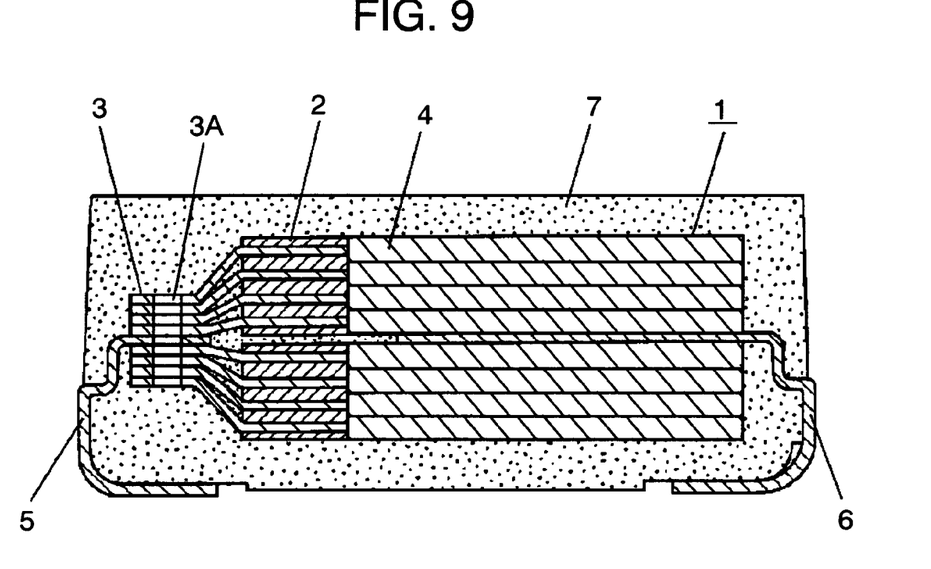
FIG. 9 is a sectional view of a structure of a solid electrolytic capacitor in accordance with exemplary embodiment 4 of the present invention.
Figure 10:
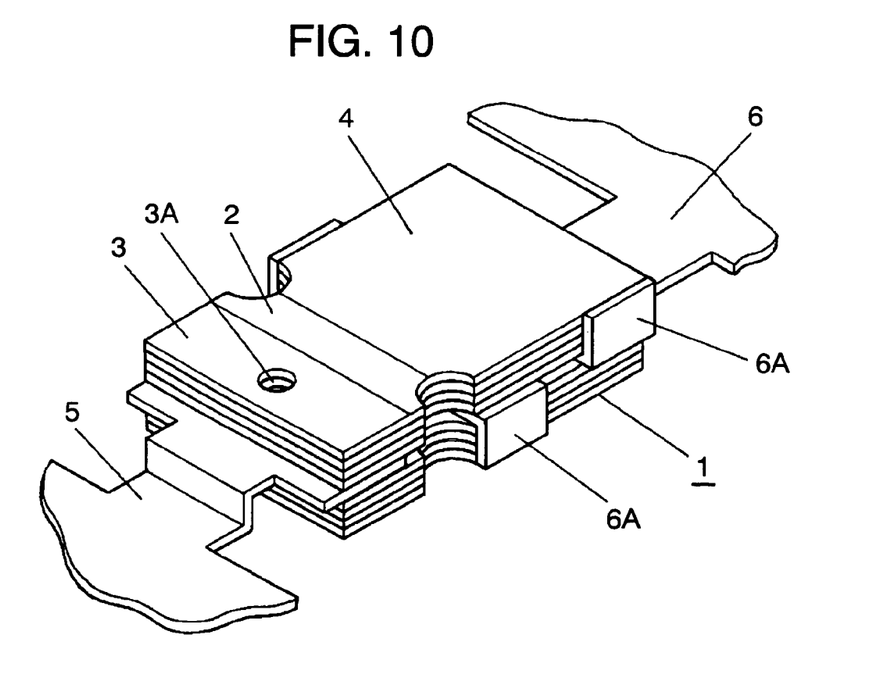
FIG. 10 is a perspective view of a state where capacitor elements are laminated on anode and cathode lead frames in the solid electrolytic capacitor in accordance with exemplary embodiment 4.

FIG. 9 is a sectional view of a structure of a solid electrolytic capacitor in accordance with exemplary embodiment 4 of the present invention. FIG. 10 is a perspective view of a state where a plurality of capacitor elements are laminated on anode and cathode lead frames in the solid electrolytic capacitor. Through hole 3A is formed in anode section 3 of each capacitor element 1. Through hole 3A is disposed at a position corresponding to through hole 5A formed in the joint surface of anode lead frame 5. Through hole 3A is communicated with through hole 5A in a state where the plurality of capacitor elements 1 are disposed on the joint surface of anode lead frame 5, and the plurality of capacitor elements 1 are interconnected via the communicated through holes 3A, 6A by resistance welding. The structure of the present exemplary embodiment is the same as that of exemplary embodiment 1 except for the foregoing elements.

Figure 11:
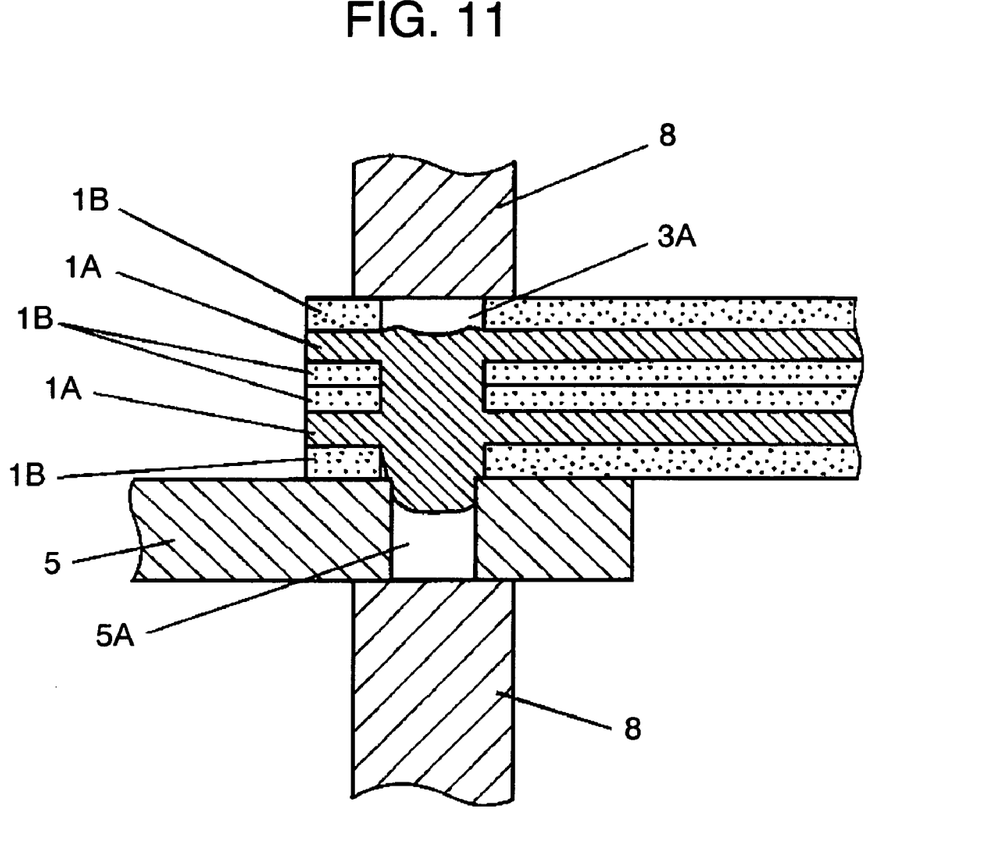
FIG. 11 is a sectional view of an essential part showing a state where anode sections of capacitor elements are joined to the anode lead frame in the solid electrolytic capacitor in accordance with exemplary embodiment 4.

As shown in FIG. 11, during resistance welding between anode lead frame 5 and capacitor elements 1 in the solid electrolytic capacitor of the present embodiment, aluminum provided by melting anode bodies 1A collects into through holes 3A and through hole 5A. Thus, anode lead frame 5 is joined to capacitor elements 1. Stable joining is therefore allowed without heavily damaging appearance. As a result, increase or dispersion of the ESR following instability of welding is suppressed, and a solid electrolytic capacitor having high reliability can be stably manufactured.

Rivet 9 or spacer 10 discussed in embodiment 2 or 3 may be employed in the solid electrolytic capacitor of the present embodiment. In this case, rivet 9 or spacer 10 preferably penetrates through both through holes 3A and 5A. Rivet 9 preferably holds anode lead frame 5 and the plurality of anode sections 3 by crimping. Anode sections 3 are conducted to anode lead frame 5 only by the crimping, but resistance welding between rivet 9 and anode sections 3 strengthens the joint and improves the ESR characteristic. Especially, this configuration of the present embodiment is advantageous when metal joining between them by resistance welding is difficult because the material of anode sections 3 is different from that of anode lead frame.

The solid electrolytic capacitor of the present invention has anode lead frame 5 integrally connecting to respective anode sections 3 of a plurality of laminated capacitor elements 1, and cathode lead frame 6 integrally connecting to cathode sections 4 of capacitor elements 1. Through hole 5A is formed in joint surface 5P of anode lead frame 5 for supporting anode sections 3 of capacitor elements 1. Anode sections 3 of capacitor elements 1 are joined to anode lead frame 5 via through hole 5A by resistance welding. In this structure, during the resistance welding between anode sections 3 and anode lead frame 5 via through hole 5A, current collects to through hole 5A due to the resistance welding. The collection breaks dielectric oxide film layer 1B formed on a surface of anode sections 3 to expose the aluminum foil, and the molten aluminum foil collects into through hole 5A. Stable welding work is therefore allowed without splashing the aluminum foil of anode sections 3. A solid electrolytic capacitor having high welding strength, high reliability, and reduced ESR can be obtained.

Aluminum foil is used as the valve action metal in all of the embodiments; however, tantalum, niobium, or an alloy of them may be used. The solid electrolyte layer is made of inorganic material such as manganese dioxide, conductive polymer such as polypyrrole or polyaniline, or organic semiconductor material such as tetracyanoquinodimethane (TCNQ) complex salt. A surface-mount-type solid electrolytic capacitor is illustrated in all of the embodiments; however, the present invention is not limited to this. Anode and cathode lead frames may have a configuration where one end exposed from a packaging resin is formed linearly and inserted into a wiring hole disposed in a printed board.

What is claimed is:

1. A solid electrolytic capacitor comprising:
   a capacitor element having an anode section and a cathode section formed by separating an anode body made of a valve action metal, said capacitor element having a dielectric oxide film layer, a solid electrolyte layer, and a cathode layer that are sequentially laminated on a surface of the cathode section; and
   an anode lead frame for supporting the anode section, said anode lead frame having a joint surface for supporting the anode section, said joint surface of said anode lead frame having a first through hole therein;
wherein the anode section is coupled to said anode lead frame via the first through hole.

2. A solid electrolytic capacitor according to claim 1, further comprising a rivet made of a metallic material different from a material of said anode lead frame, said rivet being inserted into the first through hole,
wherein said rivet is crimped, and the anode section is coupled to said anode lead frame via said rivet.

3. A solid electrolytic capacitor according to claim 2, wherein the metallic material forming said rivet is welded to the anode section.

4. A solid electrolytic capacitor according to claim 1, further comprising a spacer made of a metallic material different from a material of said anode lead frame, said spacer being buried in the first through hole,
wherein the anode section is coupled to said anode lead frame via said spacer.

5. A solid electrolytic capacitor according to claim 4, wherein the metallic material forming said spacer is welded to the anode section.

6. A solid electrolytic capacitor according to claim 1, wherein
the anode section of said capacitor element has a second through hole,
the second through hole is communicated with the first through hole, and
the anode section is coupled to said anode lead frame via the first through hole and the second through hole.

7. A solid electrolytic capacitor according to claim 6, further comprising a rivet made of a metallic material different from a material of said anode lead frame, said rivet being inserted into the first through hole and the second through hole,
wherein said rivet is crimped, and the anode section is welded to said rivet to be coupled to said anode lead frame.

8. A solid electrolytic capacitor according to claim 6, further comprising a spacer made of a metallic material different from a material of said anode lead frame, said spacer being buried in the first through hole and the second through hole,
wherein the anode section is coupled to said anode lead frame via said spacer.

9. A method of manufacturing a solid electrolytic capacitor, comprising:
loading an anode section of a capacitor element, the anode section and a cathode section being formed by separating an anode body made of valve action metal and having a dielectric oxide film layer, a solid electrolyte layer, and a cathode layer that are sequentially laminated on a surface of the cathode section;
providing an anode lead frame having a joint surface for supporting the anode section of the capacitor element, said joint surface of said anode lead frame having a through hole therein; and
resistance-welding the anode section to the anode lead frame via said through hole.

* * * * *